(12) United States Patent
Suzuki

(10) Patent No.: US 10,479,392 B2
(45) Date of Patent: Nov. 19, 2019

(54) VEHICLE LOWER PORTION STRUCTURE

(71) Applicant: TOYOTA JIDOSHA KABUSHIKI KAISHA, Toyota-shi (JP)

(72) Inventor: Yuichiro Suzuki, Inuyama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 14 days.

(21) Appl. No.: 15/708,466

(22) Filed: Sep. 19, 2017

(65) Prior Publication Data

US 2018/0093694 A1   Apr. 5, 2018

(30) Foreign Application Priority Data

Oct. 3, 2016 (JP) ................... 2016-195866

(51) Int. Cl.
| | |
|---|---|
| *B62D 1/02* | (2006.01) |
| *B60R 19/24* | (2006.01) |
| *B62D 21/02* | (2006.01) |
| *B62D 3/12* | (2006.01) |
| *B62D 21/05* | (2006.01) |
| *B62D 21/12* | (2006.01) |
| *B62D 27/06* | (2006.01) |
| *B62D 25/08* | (2006.01) |

(52) U.S. Cl.
CPC ............ *B62D 1/02* (2013.01); *B60R 19/24* (2013.01); *B62D 3/12* (2013.01); *B62D 21/02* (2013.01); *B62D 21/05* (2013.01); *B62D 21/12* (2013.01); *B62D 27/065* (2013.01); *B62D 25/08* (2013.01)

(58) Field of Classification Search
None
See application file for complete search history.

(56) References Cited

U.S. PATENT DOCUMENTS

| | | | | |
|---|---|---|---|---|
| 6,102,416 | A * | 8/2000 | Harkrader | B62D 3/12 |
| | | | | 280/771 |
| 7,520,514 | B2 * | 4/2009 | Ogawa | B60G 3/20 |
| | | | | 180/312 |
| 7,584,815 | B2 * | 9/2009 | Ogawa | B60G 3/20 |
| | | | | 180/312 |
| 9,751,570 | B2 * | 9/2017 | Kim | B62D 25/082 |
| 2003/0107200 | A1 * | 6/2003 | Huang | B60G 7/02 |
| | | | | 280/93.515 |

(Continued)

FOREIGN PATENT DOCUMENTS

| | | |
|---|---|---|
| JP | 56-150663 U | 11/1981 |
| JP | 2001-191945 | 7/2001 |

(Continued)

*Primary Examiner* — Drew J Brown
(74) *Attorney, Agent, or Firm* — Oblon, McClelland, Maier & Neustadt, L.L.P.

(57) ABSTRACT

A vehicle lower portion structure includes: a suspension member including a pair of left and right under from side members that extend in a vehicle front-rear direction, a cross member that extends in a vehicle transverse direction and connects the under front side members, and a steering gear box that extends in the vehicle transverse direction and is formed integrally with the cross member; and an under front bumper reinforcement that extends in the vehicle transverse direction and is installed between front end portions of the pair left and right under front side members.

6 Claims, 3 Drawing Sheets

(56) References Cited

U.S. PATENT DOCUMENTS

| | | | | |
|---|---|---|---|---|
| 2011/0062677 A1* | 3/2011 | Kudla | ...................... | B62D 3/12 |
| | | | | 280/124.109 |
| 2012/0319375 A1* | 12/2012 | Uhlenbruch | ............. | B62D 3/12 |
| | | | | 280/93.502 |
| 2014/0246260 A1* | 9/2014 | Awano | ..................... | B62D 3/12 |
| | | | | 180/271 |
| 2015/0166104 A1* | 6/2015 | Ohhama | ................ | B62D 21/11 |
| | | | | 296/193.01 |
| 2018/0237071 A1* | 8/2018 | Okumoto | ............... | B62D 21/11 |

FOREIGN PATENT DOCUMENTS

| | | |
|---|---|---|
| JP | 2005-014727 | 1/2005 |
| JP | 2005-206121 | 8/2005 |
| JP | 2005-280668 | 10/2005 |
| JP | 2006-175988 A | 7/2006 |
| JP | 2009-107441 | 5/2009 |
| JP | 2014-128986 A | 7/2014 |

* cited by examiner

VEHICLE LOWER PORTION STRUCTURE

CROSS-REFERENCE TO RELATED APPLICATION

The application is based on and claims priority under 35 USC 119 from Japanese Patent Application No. 2016-195866 filed on Oct. 3, 2016, the disclosure of which is incorporated by reference herein.

BACKGROUND

Technical Field

The present disclosure relates to a vehicle lower portion structure.

Related Art

There is conventionally known a front suspension member that is structured in an "I" shape as seen in plan view from a pair of left and right side members, and a cross member that connects the pair of left and right side member in the vehicle transverse direction and with which the steering gear box is formed integrally (see, for example, Japanese Patent Application Laid Open (JP-A) No. 2001-191945). Such a front suspension member is mounted to the front portions of the front side members in a state of hanging downward.

However, if such a front suspension member is merely disposed in a state of hanging downward at the front portions of the front side members, at the time of an offset front collision of the vehicle or the like for example, it is difficult for the collision load that is inputted from an obliquely front side of the vehicle to be transmitted to the cross member of the front suspension member, and it is difficult for the collision load to be dispersed via the cross member toward the non-collision side that is at the side opposite the collision side. In this way, there is room for further improvement in a structure than efficiently disperses collision load that is inputted from an obliquely front side of a vehicle.

SUMMARY

The present disclosure provides a vehicle lower portion structure that may efficiently disperse collision load that is inputted from an obliquely front side of a vehicle.

One aspect of the disclosure is a vehicle lower portion structure including: a suspension member having a pair of left and right under front side members that extended in a vehicle front-rear direction, a cross member that extends in a vehicle transverse direction and connects the under from side members, and a steering gear box that extends in the vehicle transverse direction and is formed integrally with the cross member; and an under front bumper reinforcement that extends in the vehicle transverse direction and is installed between front end portions of the pair of left and right under front side members.

In accordance with the present aspect, the under front bumper reinforcement is installed between the from end portions of the pair of left and right under from side members that are connected by the cross member with which the steering gearbox is formed integrally. Here, the rigidity of the cross member, with which the steering gear box is formed integrally, is high as compared with a cross member with which a steering gear box is not formed integrally.

Accordingly, collision load, which is inputted from an obliquely front side of the vehicle due to, for example, an offset front collision of the vehicle, is transmitted efficiently from the one under front side member toward the other under front side member via the cross member whose rigidity has been increased. Namely, in accordance with the present aspect, the collision load that is inputted from an obliquely front side of the vehicle is dispersed efficiently toward the non-collision side that is at the side opposite the collision side.

In the present aspect, the under front side members may have fit-together portions with which vehicle transverse direction both end portions of the cross member are fit-together and joined.

In accordance with the above structure, the fit-together portions, with which the vehicle transverse direction both end portions of the cross member are fit-together and joined, are provided at the under front side members. Accordingly, the collision load that is inputted to the under front side member is transmitted efficiently toward the cross member via the fit-together portion.

Further, in the present aspect, the vehicle transverse direction both end portions of the cross member may be joined to the fit-together portions by fastening by bolts.

In accordance with the above structure, the vehicle transverse direction both end portions of the cross member are joined to the fit-together portions of the under from side members by fastening by bolts. Accordingly, at the vehicle transverse direction both end portions of the cross member, a deterioration of strength due to the heat at the time of welding does not arise, and the joining process is simplified, as compared with a structure in which the vehicle transverse direction both end portions of the cross member are joined by welding to the fit-together portions of the under front side members.

BRIEF DESCRIPTION OF THE DRAWINGS

An exemplary embodiment of the present disclosure will be described in detail based on the following figures, wherein.

DETAILED DESCRIPTION

An exemplary embodiment is described hereinafter in detail on the basis of the drawings. Note that, for convenience of explanation, arrow UP that is illustrated in the respective drawings indicates the vehicle upward direction, arrow FR indicates the vehicle forward direction, and arrow OUT indicates a vehicle transverse/width direction outer side. Further, in the following description, when vertical, front-rear and left-right directions are used without being specified, they refer to the vertical of the vehicle vertical direction, the front-rear of the vehicle front-rear direction, and the left and right of the vehicle left-right direction (i.e., the vehicle transverse/width direction).

Figure 1:
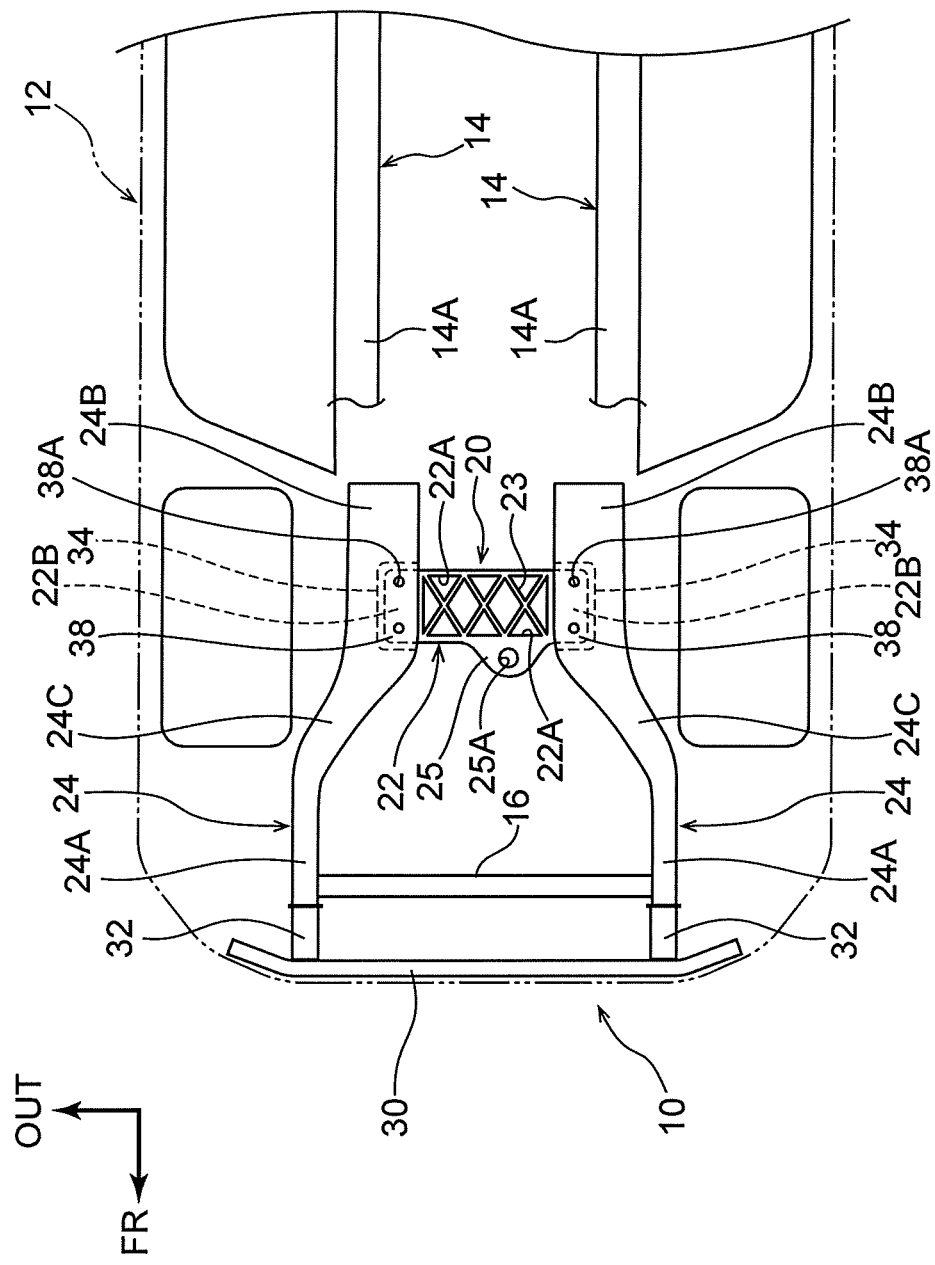
FIG. 1 is a bottom view illustrating a vehicle lower portion structure relating to an exemplary embodiment.
Figure 2:
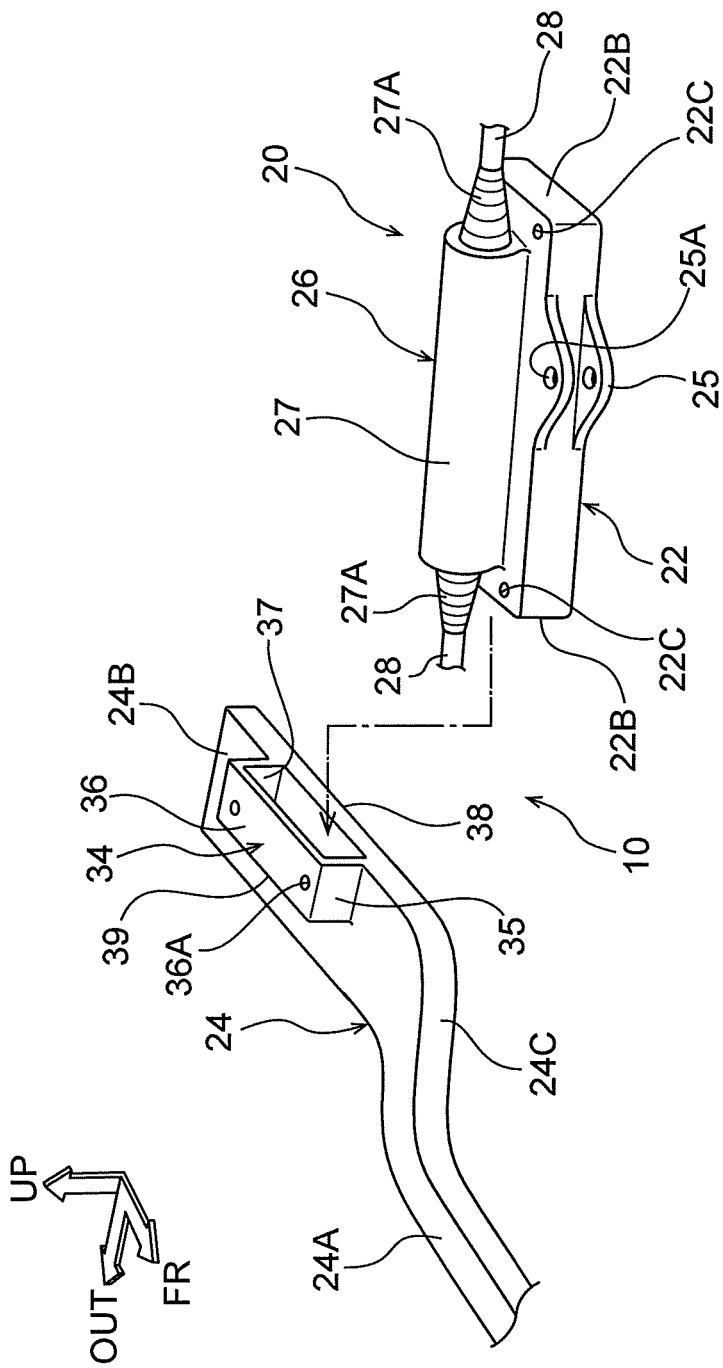
FIG. 2 is a perspective view illustrating a fit-together portion of a suspension member that structures the vehicle lower portion structure relating to the exemplary embodiment.
Figure 3:
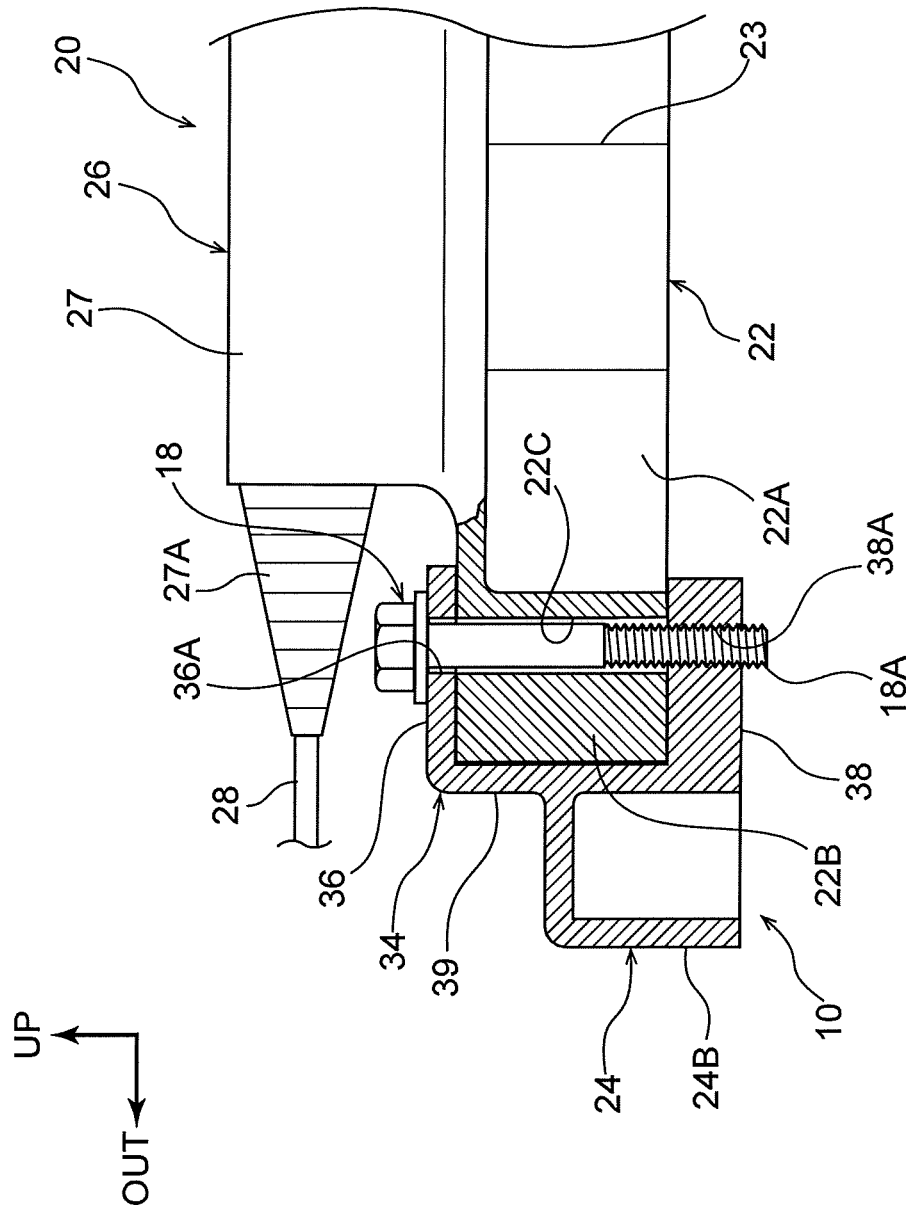
FIG. 3 is a front view illustrating, in cross-section, the fit-together portion of the suspension member that structures the vehicle lower portion structure relating to the exemplary embodiment.

As illustrated in FIG. 1 through FIG. 3, a vehicle lower portion structure 10 relating to the exemplary embodiment has a suspension member 20 that is made of metal (e.g., iron) and that has a pair of left and right under front side members 24 that extend in the vehicle front-rear direction, a cross member 22 that extends in the vehicle transverse direction and connects the pair of left and right under front side members 24, and a steering gear box 26 that extends in the vehicle transverse direction and is provided integrally with the top surface of the cross member 22.

The suspension member 20 is supported in a state of hanging-down at the front portions of a pair of left and right upper front side members 14 that extend in the vehicle front-rear direction above the under front side members 24. The structures of the under front side members 24, the cross member 22 and the steering gear box 26 of the suspension member 20 are described in detail later.

Portions midway along the pair of left and right upper front side members 14 are made to be inclined portions (not illustrated) such that the front portions (not illustrated) of the upper front side members 14 are higher than rear portions 14A thereof (see FIG. 1). An upper front bumper reinforcement (not illustrated) that extends substantially in the vehicle transverse direction is installed via crash boxes (not illustrated) between the front end portions of the pair of left and right upper front side member 14.

Further, as illustrated in FIG. 1, the vehicle lower portion structure 10 relating to the exemplary embodiment has an under front bumper reinforcement 30 that extends substantially in the vehicle transverse direction and is installed via crash boxes 32 between the front end portions of the pair of left and right under front side members 24. Namely, the vehicle 12 has a structure in which the upper front bumper reinforcement and the under front bumper reinforcement 30 are arranged vertically.

Note that the vehicle lower portion structure 10 relating to the exemplary embodiment may be structured such that the crash boxes 32 are not provided between the front end portions of the pair of left and right under front side members 24 and the under front bumper reinforcement 30. Namely, there may be a structure in which the under front bumper reinforcement 30 is directly installed between the front end portions of the pair of left and right under front side members 24.

The upper portions of the vehicle transverse direction both ends of a radiator 16 are mounted to the front end portions of the respective upper front side members 14, and the lower portions of the vehicle transverse direction both ends of the radiator 16 are mounted to the front end portions of the respective under front side members 24. Namely, the radiator 16 is mounted in a state of being supported by the front end portions of the pair of left and right upper front side members 14 and the front end portions of the pair of left and right under front side members 24.

The suspension member 20 that structures the vehicle lower portion structure 10 relating to the exemplary embodiment is described in detail next.

As illustrated in FIG. 1 and FIG. 3, the cross member 22 of the suspension member 20 is formed in a substantially rectangular open cross-sectional shape that opens downward. Plural reinforcing ribs 23, which are substantially "X" shaped as seen in a bottom view, are formed so as to be lined-up in the vehicle transverse direction and integrally with the bottom surface that is further toward the inner side that a peripheral wall 22A of the cross member 22. The respective reinforcing ribs 23 extend obliquely with respect to the vehicle front-rear direction and the vehicle transverse direction in order to increase the rigidity of the cross member 22, and connect the front side and the rear side of the peripheral wall 22A (see FIG. 1).

The shape of the respective reinforcing ribs 23 is not particularly limited, and it suffices for the shape to be a shape that may increase the rigidity of the cross member 22. The respective reinforcing ribs 23 are formed at the same height as the peripheral wall 22A of the cross member 22, and are configured such that they do not project-out further downward than the bottom surface of the peripheral wall 22A (see FIG. 3). Further, as illustrated in FIG. 1 and FIG. 2, a pair of upper and lower brackets 25, which have hole portions 25A for mounting a torque rod (not illustrated), are formed integrally with the peripheral wall 22A at the front side of the cross member 22.

As illustrated in FIG. 2 and FIG. 3, the steering gear box 26 has a rack housing 27 that is substantially cylindrical. A portion of the peripheral surface of the rack housing 27 is formed integrally with the top surface of the cross member 22. Namely, the rack housing 27 of the steering gear box 26 is formed integrally with the cross member 22 as a single member by forging (or welding). Rack ends 27A that are substantially conical-tube-shaped are provided as the vehicle transverse direction outer sides of the rack housing 27. Tie rods 28 project-out toward the vehicle transverse direction outer sides from the axially central portions of the respective rack ends 27A.

As illustrated in FIG. 2, portions midway along the pair of left and right under front side members 24 are made to be inclined portions 24C such that front portions 24A are positioned higher than rear portions 24B. The front portions 24A are formed in substantially rectangular closed cross-sectional shapes. The rear portions 24B of the respective under front side members 24 are formed in substantially flat shapes. Fit-together portions 34, with which vehicle transverse direction both end portions 22B of the cross member 22 are fit-together respectively, are formed at the vehicle transverse direction inner side end portions of the rear portions 24B of the under front side members 24.

Each of the fit-together portions 34 has a front wall 35, a top wall 36, a rear wall 37, a bottom wall 38, and an outer wall 39, and is formed in the shape of a housing that opens toward the vehicle transverse direction inner side. The vehicle transverse direction both end portions 22B of the cross member 22 may be respectively inserted into the fit-together portions 34 with hardly any gap therebetween. Further, through-holes 36A into which bolts 18 are inserted are formed in the top surface 36 of each of the fit-together portions 34 at two places that are at the front and the rear. Female screw portions 38A, with which male screw portions 18A of the bolts 18 are screwed-together, are formed in the bottom wall 38 of each of the fit-together portions 34 at two places that are at the front and the rear (see FIG. 3).

Further, through-holes 22C that pass-through in the vertical direction are formed in the vehicle transverse direction both end portions 22B of the cross member 22 at two places at the front and the rear with the rack ends 27A therebetween, in order for the bolts 18 to be inserted through. Accordingly, the vehicle transverse direction both end portions 22B of the cross member 22 are inserted-in and fit-together with the respective fit-together portions 34, and the bolts 18 are inserted from above into the respective through-holes 36A and the respective through-holes 22C, and the male screw portions 18A of the bolts 18 are screwed-together with the female screw portions 38A. Due thereto, the vehicle transverse direction both end portions 22B of the cross member 22 are joined to the respective fit-together portions 34 by fastening by bolts.

Operation of the vehicle lower portion structure 10, which relates to the exemplary embodiment and is structured as described above, is described next.

At the time of, for example, an offset front collision of the vehicles 12, collision load is inputted from an obliquely front side of the vehicle 12. Namely, collision load is inputted from an obliquely front side to the upper from bumper reinforcement and the under front bumper reinforcement 30. The collision load that is inputted to the upper front bumper reinforcement is, via one of the crash boxes, inputted to the upper from side member 14 at that one side.

Further, the collision load that has been inputted to the under front bumper reinforcement 30 is, via one of the crash boxes 32, inputted to the under front side member 24 at that one side. Here, the cross member 22 that connects the left and right under from side members 24 is formed integrally with the steering gear box 26 (the rack housing 27).

If the cross member 22 and the steering gear box 26 (the rack housing 27) are formed integrally, the rigidity of the cross member 22 is higher than if the cross member 22 and the steering gear box 26 (the rack housing 27) are structured as separated members. Namely, the rigidity of the cross member 22 is improved in the suspension member 20 relating to the exemplary embodiment.

Accordingly, as compared with a cross member (not illustrated) with which the steering gear box 26 (the rack housing 27) is not formed integrally, the collision load that is inputted to one of the under from side members 24 is transmitted efficiently from that one under front side member 24 via the cross member 22 to the other under front side member 24.

In particular, because the vehicle transverse direction both end portions 22B of the cross member 22 are inserted into and fit-together with the fit-together portions 34 that are provided at the under front side members 24, a concentration of stress at the fit-together portions 34 is suppressed, and the joining strength thereof is ensured. Accordingly, the collision load that is inputted to the under front side member 24 is transmitted efficiently to the vehicle transverse direction both end portions 22B of the cross member 22 from the front wall 35 of the fit-together portion 34 of that under front side member 24.

In this way, in accordance with the suspension member 20 that structures the vehicle lower portion structure 10 relating to the exemplary embodiment, collision load that is inputted from an obliquely front side of the vehicle 12 may be dispersed efficiently toward the non-collision side that is at the side opposite the collision side. Accordingly, at the time of, for example, an offset front collision of the vehicle 12, deformation of the vehicle passenger cabin may be suppressed.

Since the vehicle transverse direction both end portions 22B of the cross member 22 are joined by fastening by bolts to the fit-together portions 34, there are the advantages that a deterioration of strength due to the heat at the time of welding does not arise, and that the joining process may be simplified, as compared with a structure in which the vehicle transverse direction both end portions 22B of the cross member 22 are joined to the fit-together portions 34 by welding for example.

Further, since the cross member 22 of the suspension member 20 and the rack housing 27 of the steering gear box 26 are formed integrally parts for mounting the rack housing 27 to the cross member 22 are not needed, and therefore, an increase in the manufacturing cost and an increase in the weight of the vehicle 12 may be suppressed. Further, the work efficiency at the time of assembling the suspension member 20 to the vehicle 12 may be improved, and the degrees of freedom in placement of the other parts that are provided at the periphery of the cross member 22 may be increased.

The vehicle lower portion structure 10 relating to the exemplary embodiment has been described above on the basis of the drawings. However, the vehicle lower portion structure 10 relating to the exemplary embodiment is not limited to the illustrated structure, and the design thereof may be changed appropriately within a scope that does not depart from the gist of the present disclosure. For example, the present disclosure is not limited to a structure in which the vehicle transverse direction both end portions 22B of the cross member 22 are joined to the fit-together portions 34 of the under from side members 24 only by fastening by bolts, and may be made to be a structure in which they are joined by utilizing welding or the like in conjunction therewith.

What is claimed is:

1. A vehicle lower portion structure comprising:
   a suspension member including a pair of left and right under front side members that extend in a vehicle front-rear direction, a cross member that extends in a vehicle transverse direction and connects the under front side members, and a steering gear box that extends in the vehicle transverse direction and is formed integrally with the cross member; and
   an under front bumper reinforcement that extends in the vehicle transverse direction and is installed between front end portions of the pair of left and right under front side members,
   wherein the under front bumper is installed between the front end portions of the pair of left and right under front side members via crash boxes.

2. The vehicle lower portion structure of claim 1, wherein the under front side members include fit-together portions with which vehicle transverse direction both end portions of the cross member are fit-together and joined.

3. The vehicle lower portion structure of claim 2, wherein the vehicle transverse direction both end portions of the cross member are joined to the fit-together portions by fastening by bolts.

4. The vehicle lower portion structure of claim 2, wherein each of the fit-together portions includes a front wall, a top wall, a rear wall, a bottom wall, and an outer wall formed in a shape of a housing that opens towards a vehicle transverse direction inner side, the vehicle transverse direction both end portions of the cross member being respectively inserted into the fit-together portions.

5. The vehicle lower portion structure of claim 1, wherein a radiator is mounted to the front end portion of the pair of left and right under front side members, the radiator being disposed between the under front bumper reinforcement and the cross member in the vehicle front-rear direction.

6. The vehicle lower portion structure of claim 1, wherein the cross member is formed of a rectangular open cross-sectional shape that opens downward.

* * * * *